United States Patent [19]

Smith

[11] 4,030,130
[45] June 14, 1977

[54] TRANSDUCER HEAD ASSEMBLY AND APPARATUS FOR USING SAME IN A PLURAL-TRACK RECORD DISK SYSTEM

[75] Inventor: Douglas A. Smith, Fife, Scotland

[73] Assignee: Burroughs Corporation, Detroit, Mich.

[22] Filed: Nov. 27, 1974

[21] Appl. No.: 527,896

[30] Foreign Application Priority Data

Mar. 15, 1974 United Kingdom ............ 11610/74

[52] U.S. Cl. ................................................ 360/77
[51] Int. Cl.² .......................................... G11B 21/10
[58] Field of Search ..............:.................... 360/77, 78

[56] References Cited

UNITED STATES PATENTS

| | | | |
|---|---|---|---|
| 3,479,664 | 11/1969 | Stuart-Williams et al. .......... | 360/77 |
| 3,534,344 | 10/1970 | Santana .............................. | 360/77 |
| 3,821,804 | 6/1974 | Stevenson et al. .................. | 360/77 |

*Primary Examiner*—Robert S. Tupper
*Attorney, Agent, or Firm*—Larry Michael Jarvis; Benjamin J. Barish; Karl Stoess

[57] ABSTRACT

Described is a transducer head assembly for magnetic disk files, the assembly using the informational data itself recorded on the disk in the form of a plurality of annular tracks for precisely positioning the head assembly with respect to the individual tracks. For this purpose, the assembly includes an upper head cooperable with the upper face of the record disk and a lower head cooperable with the lower face of the record disk, the lower head being spaced from the upper head one-half the distance between a pair of adjacent tracks such that one head may be used for positioning purposes by centering same between two adjacent tracks on the respective face of the disk, while the other head being thereby centered with a track on its respective face of the disk, may be used for recording, reproducing or erasing data with respect to the later track.

Also described is a scheme of recording the data at different clock frequencies on different tracks, such that the clock frequencies between adjacent tracks differ by at least 2%, with the maximum difference between the clock frequency of any particular track and the nominal clock frequency being less than 5%.

11 Claims, 7 Drawing Figures

TRANSDUCER HEAD ASSEMBLY AND APPARATUS FOR USING SAME IN A PLURAL-TRACK RECORD DISK SYSTEM

BACKGROUND OF THE INVENTION

The present invention relates to a novel transducer head assembly for use with a multi-track record disk. The invention also relates to a method and apparatus using the novel transducer head assembly for recording, reproducing or erasing data with respect to the record disk, and further, to a method of using such assembly for initializing a virgin record disk.

Record disks are commonly used for storing data in computers and other data processing systems. Such record disks are provided on both faces with a layer of a magnetizable material for recording the data in the form of a plurality of spaced, annular tracks. Some disk systems, or disk files as they are frequently called, include a plurality of such record disks stacked on a common spindle and driven by a common drive, whereas other include only one record disk. Because of the expense involved in providing a head for each track, most systems use one head per disk, which means that the head must be very accurately positioned to align itself with the selected track with respect to which the data is to be recorded, reproduced, or erased.

In order to obtain the maximum storage capacity per disk, a large number of tracks are provided on each surface, for example 200 tracks per inch or more. A factor limiting the track density, however, is the precision with which a head can be positioned with respect to a selected track. Positional inaccuracies may arise from a number of factors, including spindle eccentricity; temperature-coefficient variations with respect to the disk, base, head and transducer; nonlinearity in the transducer; and setting-up errors. If the head is not precisely positioned on a track from which recorded data is to be read, the signal level will be reduced and errors may therefore occur.

A number of techniques have been devised for reducing such positional inaccuracies. One system utilizes an arrangement which generates a positional wave-form (e.g., sine-wave) as the head moves towards the spindle, the zero crossings defining the track positions. Such a system, however, does not take into account effects external to the disk, such as dimensional variations caused by unequal temperature-coefficients. Another technique utilizes "dedicated tracks", in which the head is aligned with data prerecorded on special tracks on the record disk. These systems, however, require that a substantial recording surface be allocated to the dedicated tracks and therefore deprive such surfaces from being used for recording the informational data. They are therefore used mostly with multi-disk systems in which one disk includes the prerecorded positional data.

SUMMARY OF THE PRESENT INVENTION

The present invention provides an arrangement which permits the use of the maximum storage capacity of the disk for recording informational data, by enabling very precise positioning of the transducer head with respect to the tracks on the disk while at the same time utilizing the complete surfaces of the disk for recording the informational data.

According to one aspect of the present invention, the novel transducer head assembly comprises a support, an upper transducer head carried by the support and cooperable with the upper face of the record disk, and a lower transducer head carried by the support and cooperable with the lower face of the record disk. The lower transducer head is spaced from the upper head onehalf the distance between a pair of adjacent tracks, such that one head cooperable with one face of the record disk may be used for positioning purposes by exactly centering the head between two adjacent tracks on one face of the record disk, while the other head is thereby centred with a track on the other face of the record disk and may therefore be used for recording, reproducing or erasing data with respect thereto.

The foregoing arrangement, in which one head is used for positioning while the other head is used for recording or reading, enables all the available storage space on both faces of the record disk to be utilized for recording the informational data, the informational data itself being used for precisely positioning the transducer head when recording, reproducing or erasing the data from the individual tracks.

The invention is described below with respect to magnetic transducer heads for use with magnetic record disks, this being a preferred embodiment.

According to another aspect, the invention also provides a method of recording, reproducing, or erasing data from a record disk by the use of the above-described transducer head assembly. The novel method comprises the steps of positioning one transducer head of the head assembly exactly between two adjacent tracks on one face of the record disk, and using the other transducer head for recording, reproducing or erasing data with respect to the track with which it is centered on the outer face of the record disk.

According to another feature, the informational data is recorded at different clock frequencies on adjacent tracks, the data of different clock frequencies of each pair of adjacent tracks on one surface of the record disk being filtered, separated, and used to center the one head exactly between the pair of adjacent tracks, and thereby to center the other head with a track on the other face of the record disk.

According to a further feature of the invention, there is provided a method of recording data at different clock frequencies on a plural-track record disk, characterized in grouping the tracks into a plurality of groups, recording the data at different clock frequencies among the tracks in each group with the different clock frequencies being interlaced between adjacent tracks such that each odd track has a relatively large clock frequency difference with respect to the adjacent even track but a relatively small clock frequency difference with respect to the next odd track, the clock frequency at which the data is recorded being the same at the corresponding tracks in the different groups, each group of tracks including two sub-groups; and reversing the clock frequency difference in each sub-group so that the clock frequency decreases with respect to a nominal clock frequency in one sub-group and increases with respect to the nominal clock frequency in the other sub-group.

The invention also provides a system for recording, reproducing, or erasing data with respect to a plural-track record disk, the system including the foregoing transducer head assembly; a drive for driving the assembly with respect to the record disk; position control means comparing the amplitudes of the signals from adjacent tracks read by said one data head used for positioning purposes and controlling the drive so that said signal amplitudes are exactly equal; and means controlling said other head to record, reproduce, or erase data with respect to the track on the other face of the record disk with which it is centered.

According to a further feature, the system further includes means recording the data on adjacent tracks at different clock frequencies, and filters separating the different frequencies read by the positioning head before the amplitudes are compared and used for controlling the transducer head assembly drive.

The invention also provides a novel method for initializing a virgin record disk by the use of the foregoing transducer head assembly.

Further features and advantages of the invention will be apparent from the description below.

BRIEF DESCRIPTION OF THE DRAWINGS

The invention is herein described, by way of example only, with respect to a preferred embodiment thereof illustrated in the accompanying drawings, wherein:

FIG. 2, 2A, 2B schematically illustrates the positioning, with respect to the track on one face of the record disk, of one of the heads in the transducer head assembly of FIG. 1;

DESCRIPTION OF THE PREFERRED EMBODIMENT

General Arrangement

Figure 1:
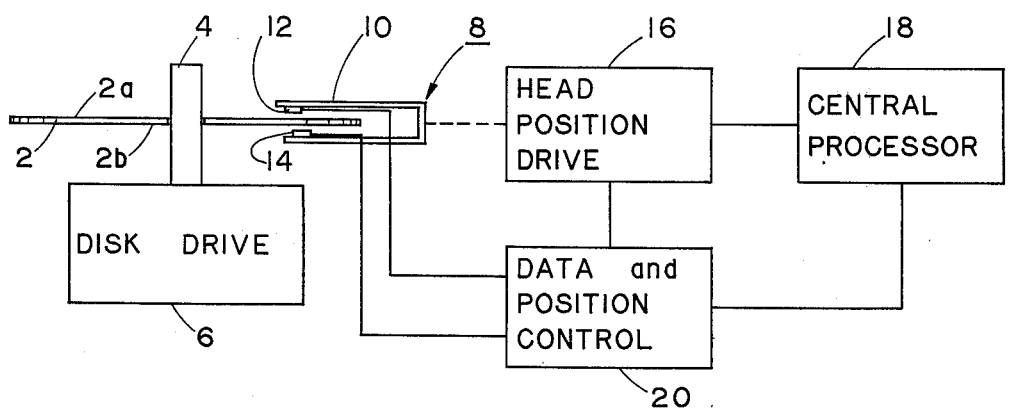
FIG. 1 is a schematic illustration of a magnetic transducer head assembly constructed in accordance with the invention, and a single disk recording system using such head assembly.

The recording system illustrated in FIG. 1 includes a single magnetic disk 2 mounted on a spindle 4 rotated by a disk drive 6. Both faces 2a, 2b of the record disk are provided, by an initializing procedure such as one described below, with a plurality of spaced annular tracks with respect to which data is to be recorded, reproduced or erased by means of a transducer head assembly, generally designated 8. This head assembly includes a support 10 carrying an upper magnetic transducer head 12 cooperable with the upper face 2a of the record disk, and a lower transducer head 14 cooperable with the lower face 2b of the magnetic disk.

The transducer head assembly 8 is positioned with respect to record disk 2 by means of a drive, generally designated 16. The latter drive moves the head assembly radially with respect to spindle 4, to a selected track as specified by an address supplied from an input device. The input device, which for the sake of simplification is represented by central processor block 18, supplies the data to be recorded and receives the data to be reproduced, and also supplies the track address at which the operation is to be performed.

Drive 16 is controlled by a system, generally designated 20, to precisely align the head during the recording, reproducing, or erasing operation with respect to the selected track. The data path from or to central processor 18 also includes system 20, as schematically shown in FIG. 1.

The disk drive 6, head position drive 16, and the manner of addressing same from the central processor 18 (or other input device) are all well known and therefore for the sake of brevity they are not described herein except when necessary to explain the present invention. The present invention concerns primarily the construction of the transducer head assembly 8 and the manner of precisely controlling its position by control system 20.

Construction of Transducer Head Assembly

The lower magnetic head 14 of the transducer assembly 8 is spaced from the upper magnetic head 12 one-half the track pitch, is., the distance between a pair of adjacent tracks on the record disk. This is shown somewhat exaggeratedly in FIG. 1, wherein it will be seen that the lower head 14 is spaced outwardly in a radial direction with respect to disk 2 from the upper head 12. With such an arrangement, it will be seen that when one head is exactly centered between and straddles two adjacent tracks on one face of the record disk, the other head will be exactly aligned with a track on the other face of the record disk. Thus, one head cooperable with one face of the disk may be used for positioning purposes, and the other head, being thereby exactly aligned with a track on the other face of the record disk, may be used for recording, reproducing or erasing informational data.

Figure 2:
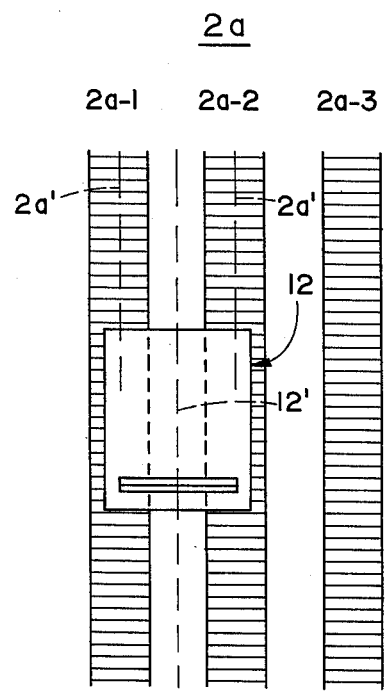
Figure 3:
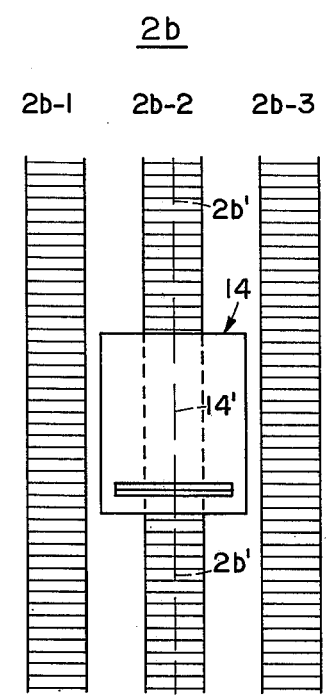
FIG. 3 schematically illustrates the positioning of the other head in the assembly with respect to the tracks on the other face of the magnetic disk.

This is more clearly shown in FIGS. 2 and 3 which illustrate, respectively, the positions of the two heads 12, 14 with respect to the tracks on their respective faces 2a, 2b of the magnetic disk. Shown in FIG. 2 is the condition wherein the upper head 12 is exactly centered between and straddles two adjacent tracks (2a-1, 2a-2) on the upper face 2a of the record disk, this condition being indicated by the center line 12' of head 12 being exactly midway between the center lines 2a' of the two adjacent tracks. FIG. 3 shows that, when the upper head 12 is so positioned, the lower head 14 will be exactly centered with one track (2b-2) on the lower face of the record disk, this condition being indicated by the center line 14' of the head exactly coinciding with the center line 2b' of the respective track.

Thus, when recording on the lower face 2b of the disk, head 12 may be used in cooperation with the tracks on upper face 2a of the disk to exactly align head 14 with respect to a selected track on the lower face of the disk, and once this is done, head 14 may then be used for recording, reproducing or erasing the information with respect to the selected track. In a similar manner, head 14 cooperable with the lower face of the disk may be used for centering head 12 on a selected track on the upper face of the disk.

As one example, disk 2 may have tracks written on both faces at a density of 200 tracks per inch, whereby the track center lines 2a', 2b' are spaced from each other 5 mils. In such a case, the center line 12' of the upper head 12 would be displaced 2.5 mils from the center line 14' of the lower head 14, so that when the center line 12' of the upper head is precisely positioned between two adjacent tracks on the upper face, the lower head center line 14' will be precisely positioned over the center line of a track on the lower face, for recording, reproducing, or erasing data with respect thereto.

Thus, all the tracks on both faces of the magnetic disk are used for recording informational data, each head cooperating with the magnetic tracks on its respective face of the disk for positioning the other head to record or extract the informational data from the tracks on the other face of the disk.

The manner of positioning one head precisely between two adjacent tracks is based on balancing the signal amplitudes from the two tracks, and is described more particularly below with respect to FIG. 5.

Clock Frequencies of Recording

Since the data itself on the tracks is also used for positioning purposes, the data on adjacent tracks are recorded at different clock frequencies so that the data on one track can be discriminated from the data on the other. A preferred scheme of clock frequencies is described below. The system further includes filters for separating the different frequencies read by the positioning head before their amplitudes are compared and used for controlling the transducer drive in order to position the other head for data recording or reproducing purposes.

In many systems in which the disk file described herein is to be used, the data enters and leaves the disk file asynchronously, so that a total frequency difference of the order of 5% is completely transparent to the data processing system. On the other hand, disk speed variations due to motor-cogging, belt-slip, and the like, may be as high as 1%, with an additional 1% for long-term variations.

The present invention provides an arrangement in which the clock frequencies between adjacent tracks differ by at least 2%, with the maximum difference between the clock frequency of any particular track and the nominal clock frequency being less than 5%. Thus, the system can discriminate between the different clock frequencies of adjacent tracks without special interfacing to the input or output units.

Briefly, this is accomplished by grouping the tracks into a plurality of groups with correspondingly-numbered tracks in each group being recorded at the same clock frequency. The different frequencies at which the tracks are recorded are interlaced between adjacent tracks such that each odd track has a relatively large frequency difference with respect to the adjacent even track, but a relatively small frequency difference with respect to the next odd track. Further, each group of tracks is divided into two sub-groups, there being means for reversing the frequency variations of each sub-group so that one sub-group decreases in frequency with respect to a nominal frequency, and the other sub-groups increase in frequency with respect to the nominal frequency.

Figure 4:
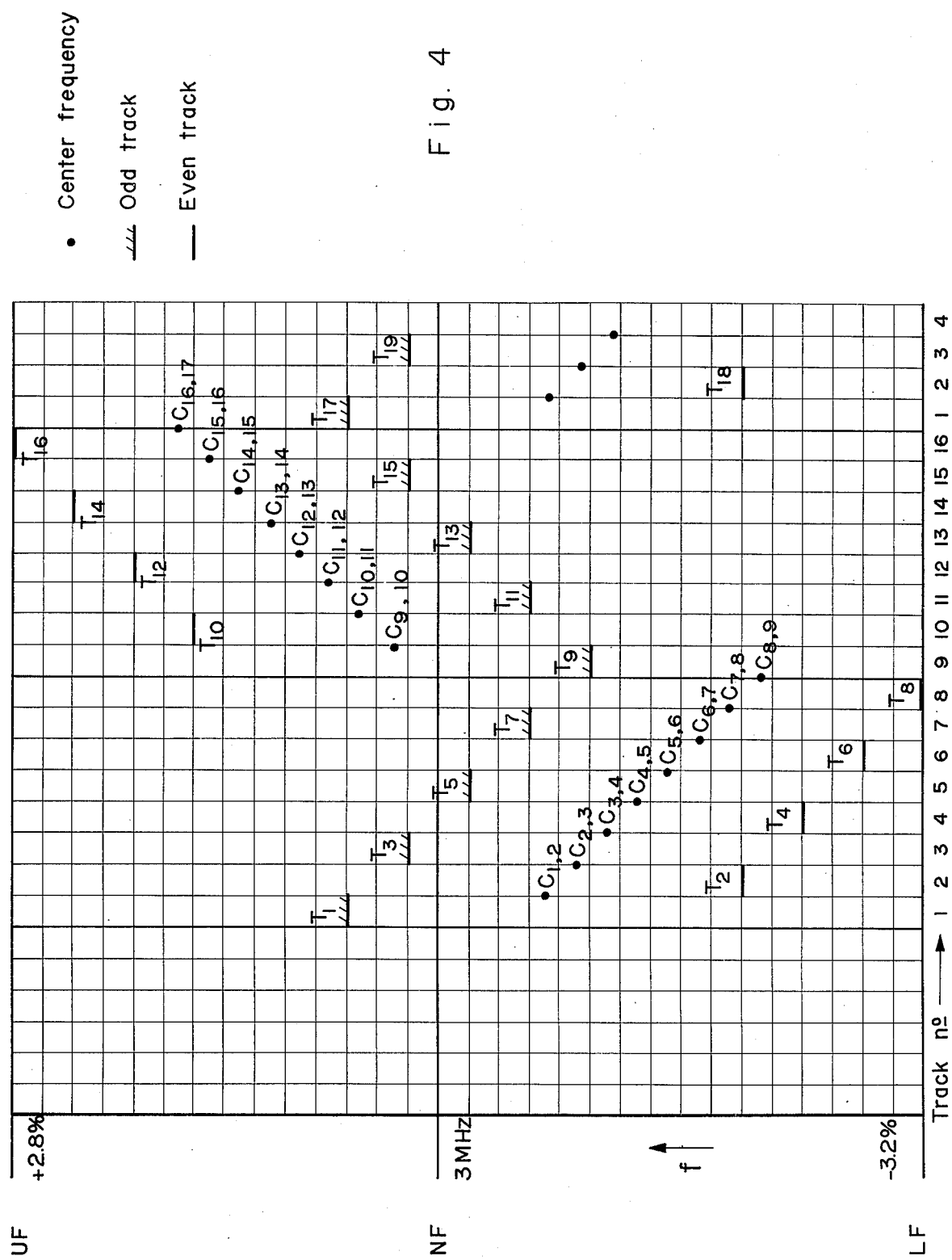
FIG. 4 is a diagram of the different clock frequencies at which data is recorded in the various tracks of the magnetic disk.

The foregoing arrangement is more particularly illustrated in the diagram of FIG. 4, wherein each group includes 16 tracks ($T_1$–$T_{16}$) divided into two sub-groups ($T_1$–$T_8$ and $T_9$–$T_{16}$) of 8 tracks each. The system uses 13 different clock frequencies.

Thus, as shown in FIG. 4, the center or nominal clock frequency is 3 MHz as represented by line NF. The lowermost clock frequency at which the data signals are recorded is represented by line LF and differs from the nominal frequency NF by about 3.2%, and the uppermost frequency at which the data signals are recorded is represented by line UF and also differs from the nominal clock frequency NF by about 2.85%. It will thus be seen that each square in the diagram of FIG. 4 represents a frequency difference of approximately 0.2%.

The first odd track ($T_1$) receives the data signals at a clock frequency of about 0.6% above the nominal clock frequency (line NF), and the next adjacent even track ($T_2$) receives the data signals at a clock frequency of about 2% below the nominal clock frequency. The frequency difference between the two adjacent tracks is thus about 2.6%.

The next odd track ($T_3$) receives the data signals at a clock frequency of about 0.2% above the nominal clock frequency, while the next adjacent even track ($T_4$) receives the data signals at a clock frequency of about 2.4% below the nominal frequency, resulting in a frequency difference also of about 2.6%.

The next adajacent track ($T_5$) is recorded at a clock frequency of about 0.2% below the nominal frequency, while the next adjacent even track ($T_6$) is recorded at a clock frequency of about 2.8% below the nominal frequency.

The last odd track ($T_7$) in the first sub-group records at a clock frequency of about 0.6% below the nominal frequency, and the last even track ($T_8$) in the first sub-group records at a clock frequency of about 3.2% below the nominal frequency.

In the first sub-group of track $T_1$–$T_8$, therefore, while the frequency difference between adjacent tracks is about 2.6% in each case, the greatest deviation from the nominal frequency is represented by the last even track ($T_8$), and this deviation is only about 3.2% from the nominal frequency.

FIG. 4 also illustrates the centre frequencies between two adjacent tracks: Point $C_{1,2}$ is the centre frequency between tracks $T_1$ and $T_2$; point $C_{2,3}$ is the centre frequency between tracks $T_2$ and $T_3$; point $C_{3,4}$ is the centre frequency between tracks $T_3$, $T_4$; and so on.

It will be seen that in the first sub-group of tracks $T_1$–$T_8$, the odd tracks are recorded at the higher clock frequency than their respective even tracks; also, the clock frequencies of both odd and even tracks continuously decrease with respect to the nominal frequency.

In the second sub-group of track $T_9$–$T_{16}$, a phase reversal occurs so that the clock frequencies of the tracks continuously increase with respect to the nominal frequency; also, the odd tracks are recorded at a lower clock frequency than their respective even tracks.

Thus, the first odd track ($T_9$) in the second sub-group is recorded at a clock frequency of about 1.0% below the nominal frequency, whereas its adjacent even track ($T_{10}$) is recorded at a clock frequency of about 1.6% above the nominal frequency. The next adjacent odd track ($T_{11}$) is recorded at about 0.6% below the nominal frequency, whereas its next adjacent even track ($T_{12}$) is recorded at about 2.0% above the nominal frequency. The next odd track ($T_{13}$) is recorded at about 0.2% below the nominal frequency, whereas its adjacent even track ($T_{14}$) is recorded at about 2.4% above the nominal frequency; and the last odd track ($T_{15}$) is recorded at about 0.2% above the nominal frequency whereas the last even track ($T_{16}$) is recorded at about 2.8% above the nominal track frequency.

The centre frequencies between adjacent tracks in the second sub-group are also indicated in FIG. 4 by points $C_{8,9}$; $C_{9,10}$; $C_{10,11}$; $C_{11,12}$; $C_{12,13}$; $C_{13,14}$; $C_{14,15}$; and $C_{15,16}$.

It will thus be seen that also in the second sub-group, the frequencies of adjacent tracks differ by about 2.6% with the maximum difference of any track in the sub-group with respect to the nominal frequency being about 2.8%.

FIG. 4 illustrates these clock frequency differences in an approximate manner for the sake of convenience. Optimumly, however, the frequency difference between adjacent tracks should be about 2.8%, and the maximum difference between the nominal frequency of any particular track should be about 3.15%.

Figure 5:
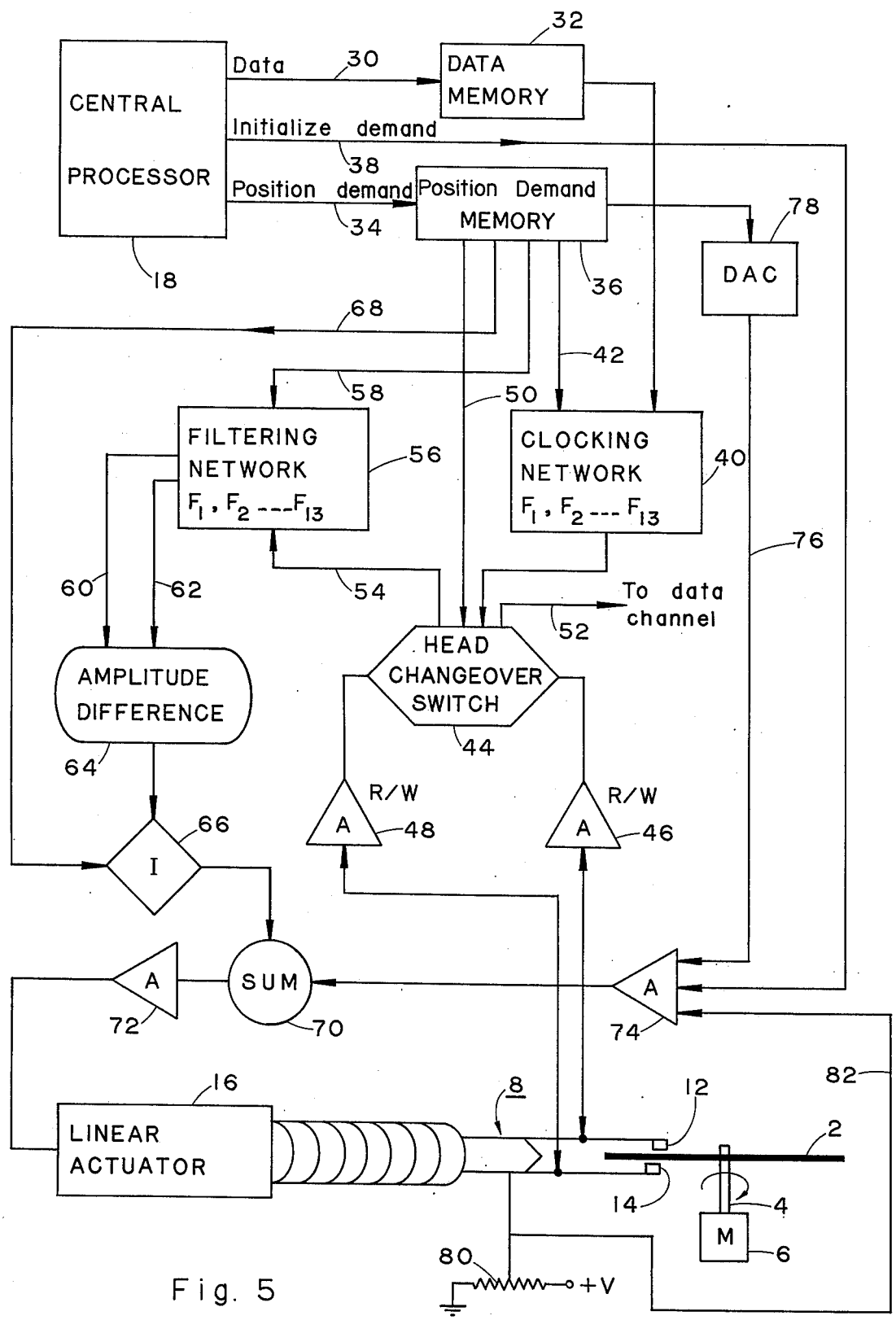
FIG. 5 is a diagram schematically illustrating the overall system for recording and reproducing data with respect to the multi-track disk, and also for initializing a virgin record disk.

Overall System of FIG. 5

FIG. 5 illustrates the overall system that may be used for recording and reproducing the data at the different clock frequencies as discussed above so as to enable one magnetic head to be used for positioning purposes, and the other magnetic head to be used for actually recording, reproducing or erasing the data. The system of FIG. 5 also includes means for initializing a virgin magnetic disk, the specific procedure used for that purpose being described more fully below.

In FIG. 5 similar reference numbers are used for corresponding elements illustrated in FIG. 1. Thus, the head position drive 16 is shown in FIG. 5 as a linear actuator which is adapted to move the transducer head assembly 8 in a radial direction towards or away from spindle 4, in order to properly position the upper and lower magnetic heads 12, 14 with respect to the magnetic tracks on the upper and lower faces of the magnetic disk 2.

The central processor 18 (or other input device) feeds, via line 30, the informational data to data memory or buffer 32, which stores the data before being recorded on the magnetic disk 2. Central processor 18 also supplies the positional demand data, namely the address of the track on which the data is to be recorded, this data being fed via line 34 to a position demand memory 36. Central processor 18 has a further output line 38 controlling the initialization of a virgin record disk, as will be described more fully below.

Substantially the remainder of the system illustrated in FIG. 5 can be considered within box 20 of FIG. 1 and concerns those elements which are involved in the data recording and reproducing operations, and also in the positioning of the transducer head assembly to the selected magnetic track of the record disk at which such operations are to be performed.

The data from memory device 32 is fed to a clocking network, generally designated 40, and is clocked at different frequencies (there being 13 frequencies, $F_1$, $F_2$ ... $F_{13}$, in the example illustrated) for recording the data on different tracks, as described above with reference to FIG. 4. The specific clock frequency is determined by the address of the track on which the data is to be recorded, and is controlled by the position demand memory 36 via line 42. This data, at the appropriate clock frequency, is then fed into a head change-over switch 44. The latter transmits the data via Read/Write amplifieres 46, 48 to the two recording heads 12, 14, and also transmits the data from such heads via the same amplifiers.

A signal from the position demand memory 36 is supplied via line 50 to head change-over switch 44 and determines whether the data is informational data to be supplied to the conventional data channel 52, or positional data, in which case it is supplied to the servo data channel 54.

As explained earlier, the informational data is also used for head-positioning purposes. Thus, the data is used as positional data when it is read by the positional head (e.g. head 12 in FIG. 2) disposed between two tracks on one face of the disk and outputted via servo channel 54, in order to exactly position the other head (e.g. 14, FIG. 3) in alignment with a tract on the other face of the disk in which the data is to be recorded or reproduced. The data read from the latter head is outputted via informational data channel 52.

The data from the positional head is fed via line 54 to a filtering network 56 which includes a plurality of filters, one for each of the frequencies $F_1$ ... $F_{13}$. The specific filters (two) to be made effective depend on the data tracks spanned by the positional head, and this is controlled by the position demand memory 36 via line 58. Filtering network 56 thus provides two outputs, on output lines 60 and 62, which correspond to the amplitudes of the signals read by the positional head from the two adjacent tracks which it spans.

These amplitude signals are fed to a network 64 which produces an analogue error signal corresponding to the difference in the amplitudes of the two input signals on lines 60 and 62. If the centre-line of the positional magnetic head is disposed exactly midway between the two adjacent tracks, the output of network 64 would be zero, whereas in all other cases the output would be of a value and sign depending on the amount and direction the head is off-position with respect to the centre-line between the two adjacent tracks.

The output of amplitude difference network 64 is fed to a network 66 which digitally controls the inversion of the amplitude difference signal, this control being effected via line 68 by the position demand memory 36. The output of network 66 is then fed to a summing network 70, the output of which is fed via servo amplifier 72 to the linear actuator 16 which drives the transducer head assembly 8 with respect to the magnetic record disk 2.

Summing network 70 is also fed with the output of an amplifier 74, in addition to the analogue signal corresponding to the difference in amplitudes of the signals on lines 60 and 62. The latter amplifier has, at one input 76, an analogue voltage corresponding to the demanded position supplied by demand memory 36 via digital-to-analogue converter 78. The second input to amplifier 74 is from a linear potentiometer 80 for the coarse position control.

Network 66 may or may not invert the error signal from the amplitude difference network 64, depending on whether the track being centered is an odd or even track.

Thus, if the track being centered is to correspond to center point $C_{1,2}$ in FIG. 4, an increase in the amplitude of the higher frequency signal, produced by a forward error, will cause the servo to move the head assembly backwardly, thereby reducing the error to zero, at which time the data head is exactly centered at point $C_{1,2}$.

On the other hand, if the track being centered is to correspond to center point $C_{2,3}$ in FIG. 4, an increase in the amplitude of the higher frequency signal is to produce a forward movement of the head assembly to point $C_{2,3}$, rather than a backward movement to point $C_{1,2}$. In such a case, a signal is supplied to network 66 via line 68 from the position demand memory 36, commanding network 66 to invert the error signal from amplitude difference network 64, whereby the head assembly will be moved forwardly to point $C_{2,3}$.

As will be recalled, the arrangement described above with respect to FIG. 4 repeats the same clock frequency pattern with each group of 16 tracks. Thus, there is a possible frequency ambiguity every 16 tracks. This can easily be overcome, however, by the coarse position control system.

For this purpose, amplifier 74 is a switched-amplifier producing an output proportional to the differnce in the inputs from line 76 and 82 whenever such difference in input is greater than a predetermined number less than 7, say three, tracks. When the difference is less than the predetermined number, the output from amplifier 74 is zero, except when initializing as will be described below. Amplifier 74 thus provides sufficient coarse position control to take care of the possible ambiguity occurring every 16 tracks.

Since the ambiguity has a cycle of 16 in the described system, 7 is the maximum error possible, as an error of over 8 brings it closer to the next, ambiguous cycle, whereas an error exactly of 8 is unstable, both correct and ambiguous settling points being equally likely. An error of 3 in the above operation of the switched-amplifier 74 is therefore arbitrary, as the error could be up to 7 in the described system.

Any suitable known arrangement may be used for the clocking nework to provide the different clock frequencies for the various tracks. One technique would be to use a disk with some 200 equally-spaced holes or transparent sectors, and a conventional light chopper to provide a pulse string which controls a phase-locked loop. Thus, the clock frequency would be defined by the disk rotational speed. By including a variable-module counter in the loop, which is a well-known technique, the output frequency can be modified according to the clock frequency of the respective track as described above with reference to FIG. 4.

Initializing a Virgin Record Disk

Virgin disks may be initialized by using one drive to write a plurality of disks with the initializing pattern of a master disk.

As indicated earlier, the system illustrated in FIG. 5 can also be used for initializing a virgin record disk. When the disk is to be initialized, a signal is fed by the central processor 18 via line 38 to amplifier 74 to disable its track-ambiguity-correcting function described earlier. In such a case, the output of amplifier 74 would be the sole control of the linear actuator 16 so that the latter would respond only to the position demand signal supplied by central processor 18 via line 76, and the course position potentiometer 80 which is used as the position transducer during this operation. Several procedures may be used for initializing a virgin record disk.

One procedure would be to record a plurality (e.g. all) the annular, spaced tracks on one face of the record disk by the use of one head (e.g. the upper head 12) of the transducer assembly; record a plurality of the tracks on the other face of the record disk by positioning the upper head 12 exactly between adjacent tracks on the upper face of the disk by the coarse and fine position control system of FIG. 5, while using the other head (e.g. the lower head 14) for recording the tracks on a lower face of the disk; re-recording the tracks on the upper face of the disk, with a reduced positional error between tracks, by positioning the lower head of the assembly exactly between two adjacent tracks on the lower face, while using the upper head for re-recording the tracks on the upper face; and repeating the process on both faces of the record disk, each time further reducing the positional error between tracks, until the positional error is reduced to the desired value.

For example, in a record disk having about 400 tracks on each face, with a track density of 200 tracks per inch and with a track width of 5 mils., pitch errors can be reduced from about 2.5 mils to less than 0.5 mils by rewriting the tracks about 3 times. It will be appreciated that additional rewriting would further reduce pitch errors.

Another technique that could be used for initializing a virgin record disk would be as follows: (1) write track 0 first with the upper head and then with the lower head; (2) write track 1 with the upper head. Using an arbitrary D.C. input to balance against the lower head output (with appropriate choice of D.C. input, this will be within ±¼ track pitch of the correct position for track 1); (3) with the lower head, write track 1 using the upper head for positioning between track 0 and 1 ; (4) rewrite track 1 with the upper head, using track 0 and 1 for positioning the lower head; (5) if necessary, repeat steps 3 and 4; (6) measure the amplitude of the positional signal, resetting the D.C. bias input to the appropriate level alternately for each surface; (7) use these values to step forward in accordance with step 2 above for a small number of tracks; (8) repeat steps 3–6; and (9) continue the procedure until all tracks are written with the initializing pattern.

While the invention has been described with refernce to a preferred embodiment, it will be appreciated that the invention, or various aspects thereof, could advantageously be used in other forms or in other applications.

What is claimed is:
1. Apparatus for use in recording, reproducing or erasing data, comprising:
   a record disk having a plurality of equally-spaced, radial, recording tracks on both faces thereof, tracks on one side being correspondingly, equal-radially spaced with respect to respective tracks on the other side, and variable informational data being recorded onto said tracks at different clock frequencies with respect to adjacent tracks;
   support means;
   an upper transducer head carried by said support means and cooperable with the upper face of said disk for reading or writing informational data from or onto said tracks;
   a lower transducer head carried by said support means and cooperable with the lower face of said disk for reading or writing informational data from or onto said tracks, said lower transducer head fixed in a radially spaced relationship from said upper head with respect to said disk by one-half the distance between pairs of adjacent of said equally spaced tracks; and
   means for centering either one of said heads with a said track by correspondingly centering other of said heads between two adjacent of said tracks on the opposite face of said disk, said means comprising:

1. means for separating reproduced data from said other head according to said different clock frequencies of said two adjacent tracks;
2. Means for comparing the amplitude of said separated reproduced data; and
3. Drive means responsive to said comparing means for driving said heads radially with respect to said disk for maintaining equal amplitude comparison by said amplitude comparison means.

2. Apparatus according to claim 1, wherein, said transducer heads are magnetic heads; and said record disc is a magnetic record disc.

3. Apparatus according to claim 1, and further including:
means for addressing a data track for recording informational data thereon; and
means responsive to said addressing means for clocking the informational data to be recorded on said addressed track at the respective clock frequency associated with the addressed data track.

4. Apparatus according to claim 1, and further including means for addressing a data track for reading or writing data thereon; and wherein said separating means includes a plurality of frequency filter means, each of said filter means being frequency associated with a clock frequency of said tracks; and wherein said separating means is responsive to said addressing means for affecting the said frequency filtering means corresponding to the clock frequency of the data tracks spanned by said other head when said one head is centered with said addressed track.

5. Apparatus according to claim 1, and further including:
means for addressing a data track for reading/writing data thereon; and
switch means responsive to said addressing means for supplying said recording data on the said head associated with the disc side opposite said addressed track, to said separating means, and said switch means for transmitting informational data from or to the other of said heads for reading or writing data from, or onto said tracks.

6. Apparatus according to claim 5 wherein said drive means is responsive to said address means for determining the direction of radial driving according to said addressed track.

7. Apparatus according to claim 1, wherein said tracks are grouped in a plurality of groups, each of said groups including an equal plurality of tracks having corresponding tracks in each group recorded at the same clock frequency.

8. Apparatus according to claim 7, wherein said different clock frequencies at which said tracks are recorded are interlaced in relatively large clock frequency differences between adjacent tracks and relatively small clock frequency differences between alternate adjacent tracks.

9. Apparatus according to claim 8, wherein said clock frequencies of adjacent tracks differ by at least 2% and the maximum difference between a nominal clock frequency and the clock frequency of any one track is less than 5%.

10. Apparatus according to claim 8, wherein each group of said tracks includes two sub-groups, the clock frequency centers between adjacent tracks decreasing in clock frequency with respect to a nominal clock frequency in one of said sub-groups, and increasing in clock frequency with respect to the nominal clock frequency in the other of said sub-groups.

11. Apparatus according to claim 10, wherein said clock frequencies of adjacent tracks differ by at least 2% and the maximum difference between the nominal clock frequency and the clock frequency of any one track is less than 5%.

* * * * *